US011632344B2

(12) United States Patent
Al Majid et al.

(10) Patent No.: US 11,632,344 B2
(45) Date of Patent: *Apr. 18, 2023

(54) MEDIA ITEM ATTACHMENT SYSTEM

(71) Applicant: Snap Inc., Santa Monica, CA (US)

(72) Inventors: Newar Husam Al Majid, New York, NY (US); Jesse Chand, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,328

(22) Filed: Oct. 19, 2021

(65) Prior Publication Data

US 2022/0038403 A1 Feb. 3, 2022

Related U.S. Application Data

(63) Continuation of application No. 16/949,789, filed on Nov. 13, 2020, now Pat. No. 11,178,086, which is a
(Continued)

(51) Int. Cl.
*H04L 12/58* (2006.01)
*H04L 29/08* (2006.01)
(Continued)

(52) U.S. Cl.
CPC .............. *H04L 51/10* (2013.01); *H04L 51/08* (2013.01); *H04L 67/02* (2013.01); *H04L 51/52* (2022.05)

(58) Field of Classification Search
CPC ......... H04L 51/10; H04L 51/08; H04L 51/52; H04L 51/32; H04L 67/02; H04L 67/42
(Continued)

(56) References Cited

U.S. PATENT DOCUMENTS

| 5,754,939 A | 5/1998 | Herz et al. |
| 6,038,295 A | 3/2000 | Mattes |

(Continued)

FOREIGN PATENT DOCUMENTS

| CA | 2887596 A1 | 7/2015 |
| CN | 104603831 A | 5/2015 |

(Continued)

OTHER PUBLICATIONS

"U.S. Appl. No. 15/437,022, Examiner Interview Summary dated Jan. 7, 2019", 3 pgs.

(Continued)

*Primary Examiner* — Ruolei Zong
(74) *Attorney, Agent, or Firm* — Schwegman Lundberg & Woessner, P.A.

(57) ABSTRACT

Disclosed are media attachment systems to enable a user to embed a first media item with a link to a second media item, and distribute the first media item in a message to one or more recipient client devices. For example, the first media item may include a picture or video captured by a user at a client device. The user may generate a message that includes the first media item. In response, a media attachment system may cause display of an interface at the client device that includes an option to attach an address to a second media item to the message. For example, the second media item may include a web page, social media post, picture, or video identified by an address such as a Uniform Resource Locator (URL).

20 Claims, 13 Drawing Sheets

Related U.S. Application Data continuation of application No. 16/454,936, filed on Jun. 27, 2019, now Pat. No. 10,862,835, which is a continuation of application No. 15/437,022, filed on Feb. 20, 2017, now Pat. No. 10,374,993.

(51) Int. Cl.
*H04L 51/10* (2022.01)
*H04L 67/02* (2022.01)
*H04L 51/08* (2022.01)
*H04L 51/52* (2022.01)

(58) Field of Classification Search
USPC .......................................................... 709/206
See application file for complete search history.

(56) References Cited

U.S. PATENT DOCUMENTS

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,352,465 B1* | 1/2013 | Jing ...................... G06F 16/583 |
| | | 707/723 |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,374,993 B2 | 8/2019 | Al Majid et al. |
| 10,862,835 B2 | 12/2020 | Al Majid et al. |
| 11,178,086 B2 | 11/2021 | Al Majid et al. |
| 2002/0047868 A1 | 4/2002 | Miyazawa |
| 2002/0144154 A1 | 10/2002 | Tomkow |
| 2003/0046281 A1* | 3/2003 | Son ...................... G06F 16/955 |
| | | 707/E17.112 |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2005/0273489 A1* | 12/2005 | Pecht .................... H04L 65/612 |
| | | 709/203 |
| 2006/0242239 A1 | 10/2006 | Morishima et al. |
| 2006/0276419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0233984 A1* | 9/2008 | Franklin ................. H04L 51/58 |
| | | 455/466 |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0061835 A1* | 3/2009 | Schmidt .................. H04W 4/21 |
| | | 455/414.2 |
| 2009/0112933 A1* | 4/2009 | Kato ...................... G11B 27/322 |
| 2009/0132453 A1 | 5/2009 | Hangartner et al. |
| 2009/0158206 A1* | 6/2009 | Myllyla ............. H04N 21/4314 |
| | | 715/804 |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0054616 A1 | 3/2012 | Mittal |

(56) References Cited

U.S. PATENT DOCUMENTS

| | | | |
|---|---|---|---|
| 2012/0117162 A1* | 5/2012 | McAleer | H04L 51/52 709/206 |
| 2012/0184248 A1 | 7/2012 | Speede | |
| 2012/0209921 A1 | 8/2012 | Adafin et al. | |
| 2012/0209924 A1 | 8/2012 | Evans et al. | |
| 2012/0233159 A1* | 9/2012 | Datta | G06K 9/6228 707/E17.014 |
| 2012/0254325 A1 | 10/2012 | Majeti et al. | |
| 2012/0278692 A1 | 11/2012 | Shi | |
| 2012/0304080 A1 | 11/2012 | Wormald et al. | |
| 2012/0304224 A1* | 11/2012 | Hines | H04N 21/8586 725/34 |
| 2013/0054713 A1* | 2/2013 | Jhon | H04L 67/34 709/206 |
| 2013/0071093 A1 | 3/2013 | Hanks et al. | |
| 2013/0194301 A1 | 8/2013 | Robbins et al. | |
| 2013/0290443 A1 | 10/2013 | Collins et al. | |
| 2014/0032682 A1 | 1/2014 | Prado et al. | |
| 2014/0101266 A1* | 4/2014 | Bueno | H04L 51/52 709/206 |
| 2014/0122787 A1 | 5/2014 | Shalvi et al. | |
| 2014/0201527 A1 | 7/2014 | Krivorot | |
| 2014/0282096 A1 | 9/2014 | Rubinstein et al. | |
| 2014/0325383 A1 | 10/2014 | Brown et al. | |
| 2014/0359024 A1 | 12/2014 | Spiegel | |
| 2014/0359032 A1 | 12/2014 | Spiegel et al. | |
| 2015/0112980 A1* | 4/2015 | Sanio | G06F 16/58 707/728 |
| 2015/0127754 A1* | 5/2015 | Clark | H04L 51/10 709/206 |
| 2015/0170203 A1* | 6/2015 | Kogan | G06F 16/338 707/774 |
| 2015/0170333 A1* | 6/2015 | Jing | G06F 16/532 345/660 |
| 2015/0199082 A1 | 7/2015 | Scholler et al. | |
| 2015/0227602 A1 | 8/2015 | Ramu et al. | |
| 2015/0350133 A1 | 12/2015 | Murphy et al. | |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0180887 A1 | 6/2016 | Sehn | |
| 2016/0234151 A1 | 8/2016 | Son | |
| 2016/0277419 A1 | 9/2016 | Allen et al. | |
| 2016/0321708 A1 | 11/2016 | Sehn | |
| 2016/0359957 A1 | 12/2016 | Laliberte | |
| 2016/0359987 A1 | 12/2016 | Laliberte | |
| 2017/0004383 A1* | 1/2017 | Lin | G06K 9/6215 |
| 2017/0161382 A1 | 6/2017 | Ouimet et al. | |
| 2017/0263029 A1 | 9/2017 | Yan et al. | |
| 2017/0287006 A1 | 10/2017 | Azmoodeh et al. | |
| 2017/0295250 A1 | 10/2017 | Samaranayake et al. | |
| 2017/0374003 A1 | 12/2017 | Allen et al. | |
| 2017/0374508 A1 | 12/2017 | Davis et al. | |
| 2018/0060029 A1* | 3/2018 | Kogan | G06F 3/167 |
| 2018/0241704 A1 | 8/2018 | Al Majid et al. | |
| 2019/0319904 A1 | 10/2019 | Al Majid et al. | |
| 2021/0136016 A1 | 5/2021 | Al Majid et al. | |

FOREIGN PATENT DOCUMENTS

| | | |
|---|---|---|
| CN | 105814901 A | 7/2016 |
| CN | 110300951 A | 10/2019 |
| KR | 102255764 B1 | 5/2021 |
| KR | 102369686 B1 | 3/2022 |
| WO | WO-2012000107 A1 | 1/2012 |
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | WO-2018152514 A1 | 8/2018 |

OTHER PUBLICATIONS

"U.S. Appl. No. 15/437,022, Non Final Office Action dated Nov. 13, 2018", 13 pgs.

"U.S. Appl. No. 15/437,022, Notice of Allowance dated Mar. 20, 2019", 7 pgs.

"U.S. Appl. No. 15/437,022, Response filed Jan. 2, 2019 to Non Final Office Action dated Nov. 13, 2018", 12 pgs.

"U.S. Appl. No. 16/454,936, Non Final Office Action dated Jul. 16, 2020", 10 pgs.

"U.S. Appl. No. 16/454,936, Notice of Allowance dated Aug. 6, 2020", 8 pgs.

"U.S. Appl. No. 16/454,936, Response filed Jul. 22, 2020 to Non Final Office Action dated Jul. 16, 2020", 8 pgs.

"U.S. Appl. No. 16/949,789, Examiner Interview Summary dated Jul. 7, 2021", 2 pgs.

"U.S. Appl. No. 16/949,789, Non Final Office Action dated Jun. 21, 2021", 14 pgs.

"U.S. Appl. No. 16/949,789, Notice of Allowance dated Jul. 16, 2021", 7 pgs.

"U.S. Appl. No. 16/949,789, Preliminary Amendment filed Jan. 25, 2021", 6 pgs.

"U.S. Appl. No. 16/949,789, Response filed Jun. 22, 2021 to Non Final Office Action dated Jun. 21, 2021", 7 pgs.

"European Application Serial No. 18754686.6, Communication Pursuant to Article 94(3) EPC dated Jul. 6, 2021", 5 pgs.

"European Application Serial No. 18754686.6, Communication Pursuant to Article 94(3) EPC dated Nov. 23, 2020", 5 pgs.

"European Application Serial No. 18754686.6, Extended European Search Report dated Jan. 15, 2020", 7 pgs.

"European Application Serial No. 18754686.6, Response filed Mar. 26, 2021 to Communication Pursuant to Article 94(3) EPC dated Nov. 23, 2020", 16 pgs.

"International Application Serial No. PCT/US2018/018760, International Preliminary Report on Patentability dated Aug. 29, 2019", 7 pgs.

"International Application Serial No. PCT/US2018/018760, International Search Report dated Apr. 17, 2018", 2 pgs.

"International Application Serial No. PCT/US2018/018760, Written Opinion dated Apr. 17, 2018", 5 pgs.

"Korean Application Serial No. 10-2019-7027113, Notice of Preliminary Rejection dated Sep. 10, 2020", w/ English Translation, 10 pgs.

"Korean Application Serial No. 10-2019-7027113, Response filed Nov. 25, 2020 to Notice of Preliminary Rejection dated Sep. 10, 2020", w/ English Claims, 23 pgs.

"Korean Application Serial No. 10-2021-7015010, Notice of Preliminary Rejection dated Jun. 28, 2021", w/ English Translation, 4 pgs.

"Korean Application Serial No. 10-2021-7015010, Response filed Aug. 30, 2021 to Notice of Preliminary Rejection dated Jun. 28, 2021", w/ English Claims, 15 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the

(56) References Cited

OTHER PUBLICATIONS

Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Dala", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

"Chinese Application Serial No. 201880012539.5, Office Action dated Mar. 2, 2022", w/ English translation, 7 pgs.

"Korean Application Serial No. 10-2022-7006533, Notice of Preliminary Rejection dated Mar. 17, 2022", w/ English translation, 6 pgs.

\* cited by examiner

MEDIA ITEM ATTACHMENT SYSTEM

PRIORITY APPLICATIONS

This application is a continuation of and claims priority to U.S. patent application Ser. No. 16/949,789, filed Nov. 13, 2020, which is a continuation of and claims priority to U.S. patent application Ser. No. 16/454,936, filed Jun. 27, 2019, which is a continuation of and claims priority to U.S. patent application Ser. No. 15/437,022, filed Feb. 20, 2017, each of which are incorporated herein by reference in their entireties.

TECHNICAL FIELD

Embodiments of the present disclosure relate generally to mobile computing technology and, more particularly, but not by way of limitation, to the presentation of media items at client devices.

BACKGROUND

Current systems enable the distribution of media content between client devices. For example, a Multimedia Messaging Service (MMS) is a standard way to send messages that include multimedia content to and from a mobile phone over a cellular network. MMS enables the delivery of a variety of media, including video content, an image, a slideshow of multiple images, or audio.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
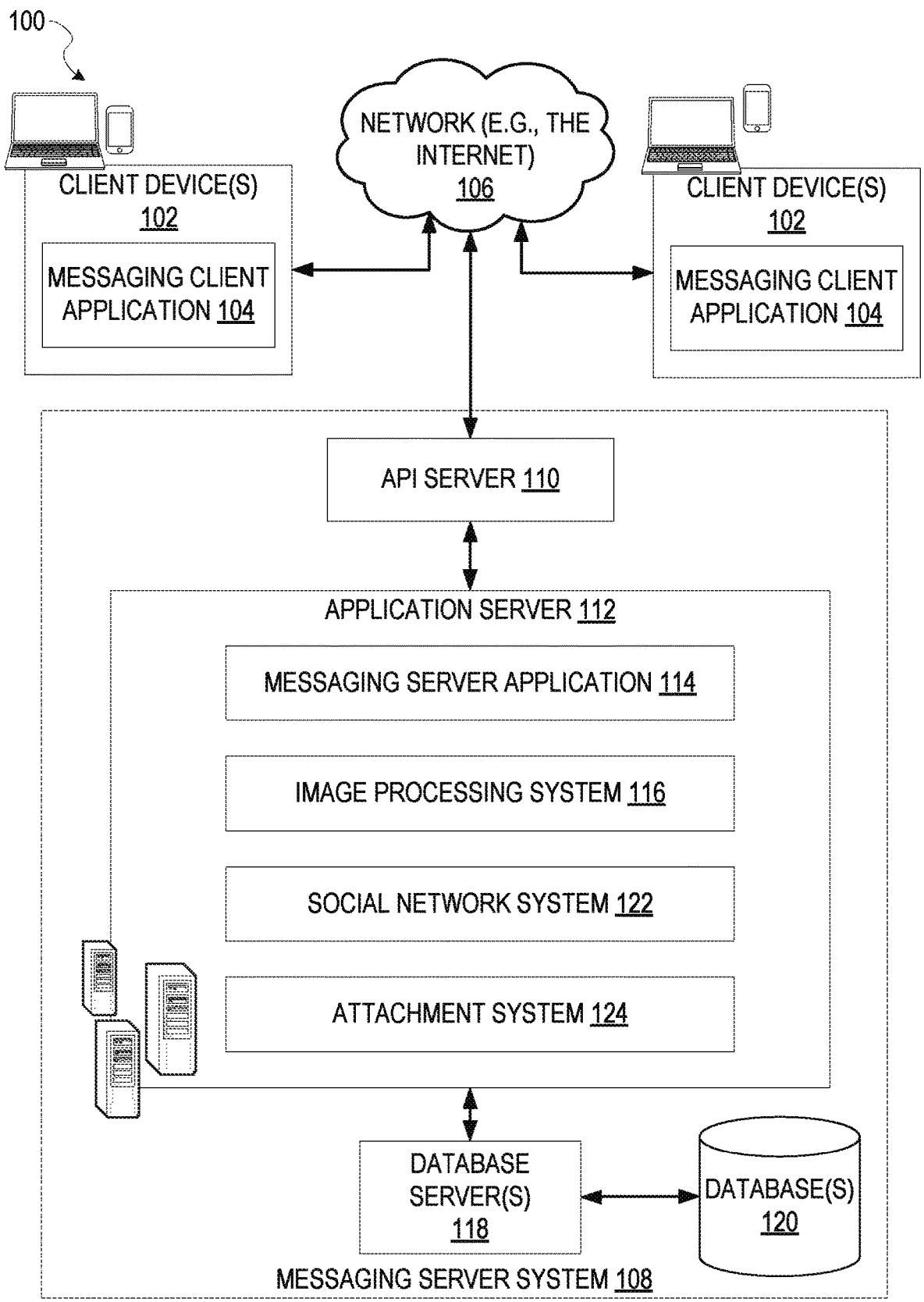
FIG. 1 is a block diagram showing an example messaging system for exchanging data (e.g., messages and associated content) over a network in accordance with some embodiments, wherein the messaging system includes an attachment system.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Disclosed are media attachment systems to enable a user to embed a first media item with a link to a second media item and distribute the first media item in a message to one or more recipient client devices. For example, the first media item may include a picture or video captured by a user at a client device. The user may generate a message that includes the first media item. In response, a media attachment system may cause display of an interface at the client device that includes an option to attach an address to a second media item to the message. For example, the second media item may include a web page, social media post, picture, or video identified by an address such as a Uniform Resource Locator (URL).

In response to receiving a selection of the second media item, the media attachment system assigns the address to the second media item to the first media item. A second client device may receive the message that includes the first media item, and in response, the media attachment system may generate and cause display of a presentation of the message at the second client device. The presentation of the message may include a graphical icon representative of the second media item.

In response to receiving a selection of the graphical icon via a user input into the second client device, the media attachment system retrieves the second media item based on the address (e.g., a URL), and generates a presentation of the second media item within the presentation of the first media item. For example, the media attachment system may cause display of a browser window within the presentation of the first media item, and navigate the browser window to the URL of the second media item.

In some example embodiments, the media attachment system generates a representation of the second media item, in response to receiving the selection of the graphical icon. For example, the media attachment system may access the address of the second media item to retrieve the second media item. Upon retrieving the second media item, the media attachment system generates a representation of the second media item, such as a screenshot of the second media item. A screenshot is an image taken to record the visible items displayed on a monitor, display, television, or other visual output device in use. Usually, this is a digital image using the operating system or software running on the computer, but it can also be a capture made by a camera or a device intercepting the video output of the display. The media attachment system causes display of the representation of the second media item within the presentation of the first media item. In further embodiments, the media attachment system generates the representation of the second media item using content of the second media item. For instance, the media attachment system identifies an image from the second media item to be used to represent the second media item (e.g., based on meta data of the second media item indicating an image associated with a title for the second media item). In this way, the media attachment system generates a representation of the second media item that is representative of the content of the second media item.

Consider an illustrative example from a user perspective. A user at a first client device generates media content (e.g., digital video) to attach to a message to a second client device. In response to attaching the media content top the message, the media attachment system prompts the user to assign an address to second media content to the message. For example, the media attachment system may cause display of an interface that includes a search window to receive search requests. The user may provide the search window with a keyword, and in response the media attachment system retrieves and causes display of a set of search results. The set of search results include media content, such as pictures, videos, social media posts, and web pages.

The user may select the second media content (e.g., a web page identified by a URL) from among the set of search results. In response to receiving the selection of the second media content, the media attachment system generates a graphical icon representative of the second media content (e.g., a logo associated with the web page). In some example embodiments, the graphical icon may indicate a type of the second content (e.g., picture, video, web page, social media post), while in further embodiments the graphical icon may include a single universal icon (e.g., an arrow, a star) for all media content types.

The user may transmit the message that includes the first media content (e.g., the digital video) to the second client device. In response, the media attachment system generates and causes display of a notification at the second client device. In response to receiving a selection of the notification, the media attachment system generates and causes display of a presentation of the first media item at the second client device, wherein the presentation includes the graphical icon representative of the second media content (e.g., a web page).

In response to receiving a selection of the graphical icon, the media attachment system generates and causes display of a browser window within the presentation of the first media content, and navigates the browser window to the web page identified by the URL.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data which may include or be included in a message).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Any such data may be used as part of or to generate anamorphic media in accordance with different embodiments described herein. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server(s) 118, which facilitates access to a database(s) 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an attachment system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database(s) 120. Examples of functions and services supported by the social network system 122 include the identification of other users of the messaging system 100 with which a particular user has relationships or is "following," and also the identification of other entities and interests of a particular user. The attachment system 124 provides functionality to identify and enable personalization of occurrences of typography identified in a presentation of an image at a client device (e.g., client device 102).

The application server 112 is communicatively coupled to one or more database server(s) 118, which facilitates access to a database(s) 120 in which is stored data associated with messages processed by the messaging server application 114.

Figure 2:
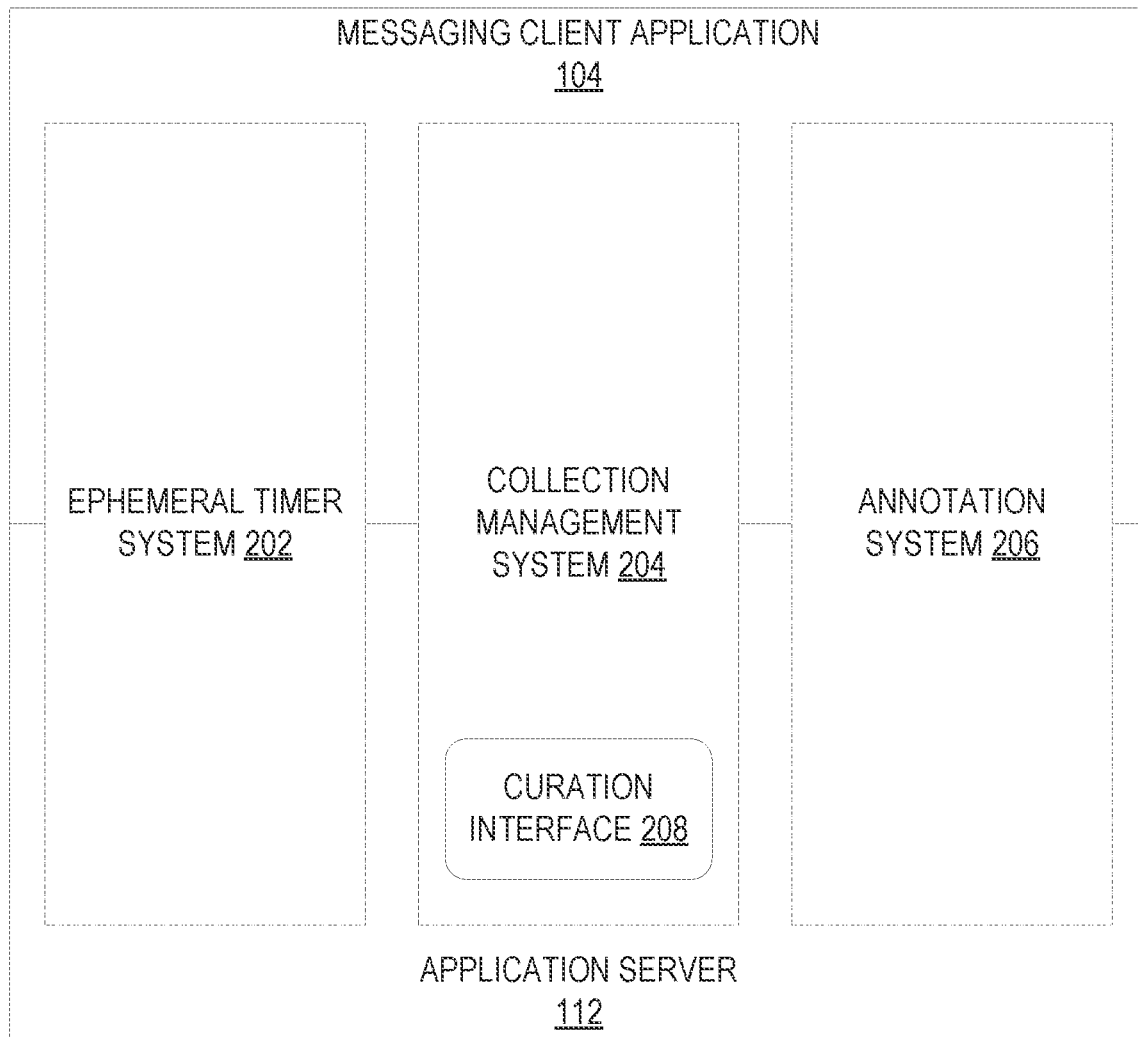
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content such as anamorphic media via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including personalized typography, images, video, text and audio) may be organized into an "event gallery" or an "event story." Such a collection may be made available for a specified time period, such as the duration of an event to which the content relates. For example, content such as media items embedded with links to other media items, such as links to web pages may be made available as a "story" for the duration of a time period. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include social media posts, web pages, pictures, texts, logos, animations, and sound effects. An example of a visual effect includes color overlaying, or projecting an anamorphic media item over a presentation depicting a space. The audio and visual content or the visual effects can be applied to a media content item (e.g., a photo) at the client device 102. For example, the media overlay including text that can be overlaid on top of a photograph or video stream generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database(s) 120 and accessed through the database server(s) 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
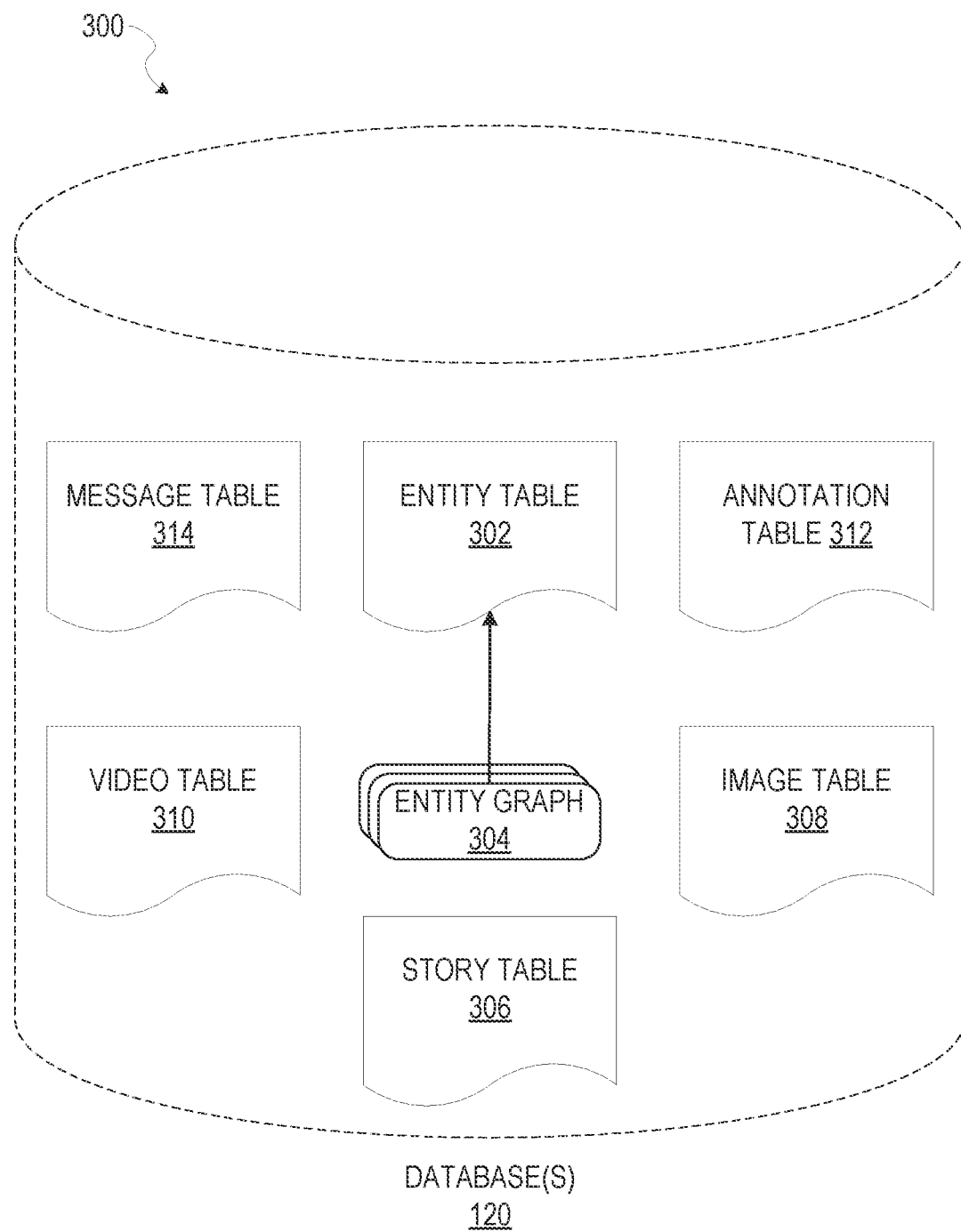
FIG. 3 is a schematic diagram illustrating data that may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data which may be stored in the database(s) 120 of the messaging server system 108, according to certain example embodiments. While the content of the database(s) 120 is shown to comprise a number of tables, it will be appreciated that the data could be stored in other types of data structures (e.g., as an object-oriented database).

The database(s) 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database(s) 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. For example, the overlay may include a graphical icon representative of a media item such as a web page. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
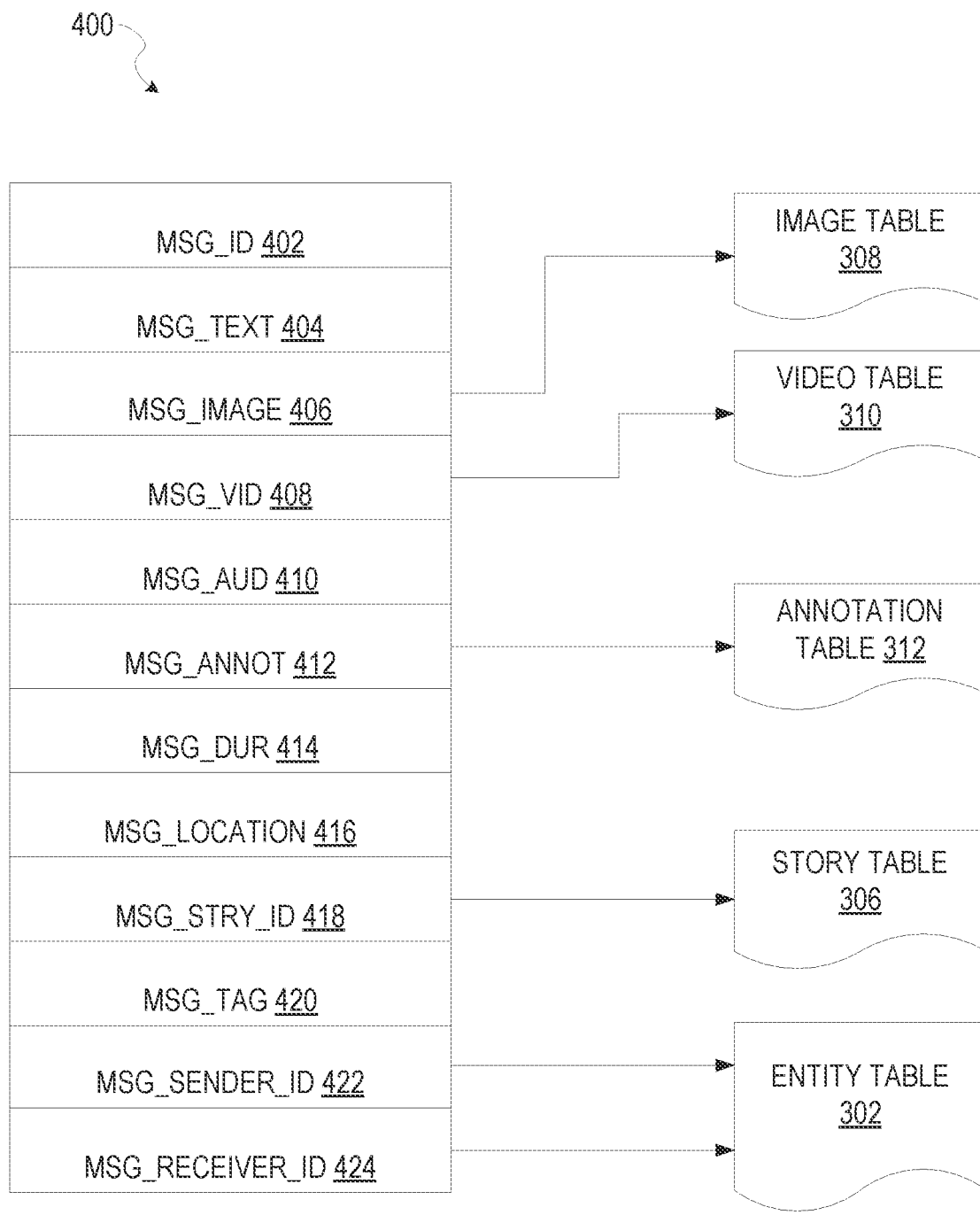
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database(s) 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
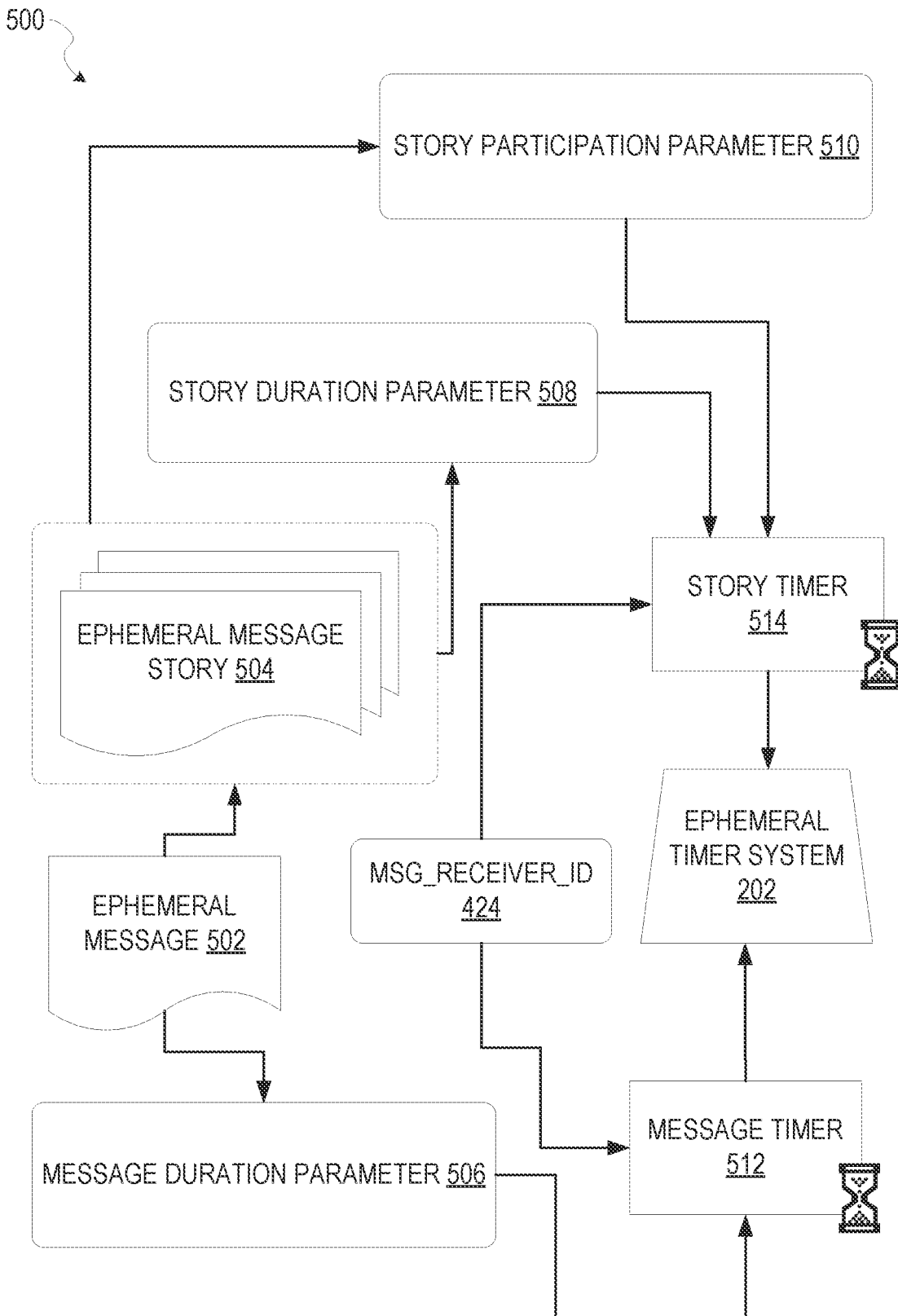
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data including a media item embedded into another media item) or a content collection (e.g., an ephemeral message story 504) may be time-limited (e.g., made ephemeral). For example, an ephemeral message 502 may include an anamorphic media item which may be displayed for a period of time specified by the story timer 514.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
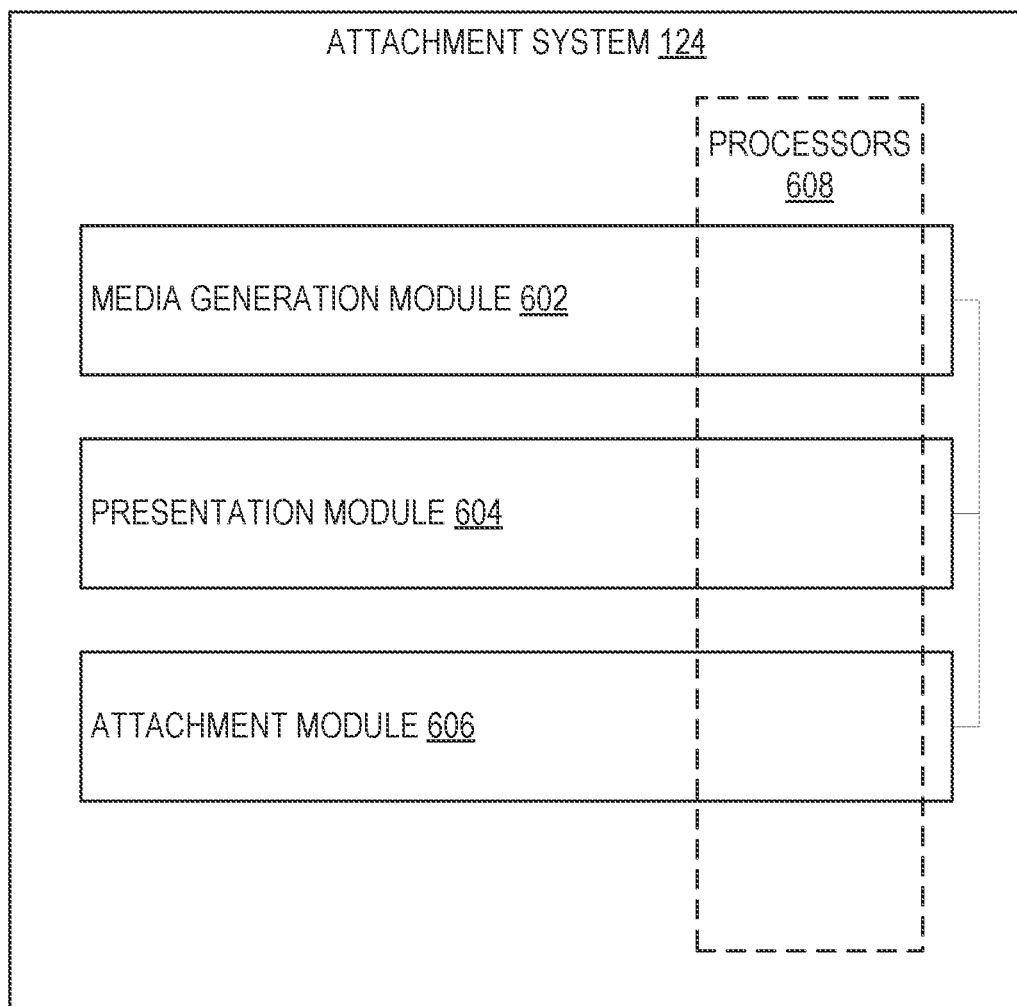
FIG. 6 is a block diagram illustrating various modules of an attachment system, according to certain example embodiments.

FIG. 6 is a block diagram 600 illustrating components of the attachment system 124, that configure the attachment system 124 to embed a first media item with a link to a second media item (e.g., a web page), according to various example embodiments. The attachment system 124 is shown as including a media generation module 602, a presentation module 604, and an attachment module 606, all, or some, configured to communicate with each other (e.g., via a bus, shared memory, or a switch). Any one or more of these modules may be implemented using one or more processors 608 (e.g., by configuring such one or more processors to perform functions described for that module) and hence may include one or more of the processors 608.

Any one or more of the modules described may be implemented using hardware alone (e.g., one or more of the processors 608 of a machine) or a combination of hardware and software. For example, any module described of the attachment system 124 may physically include an arrangement of one or more of the processors 608 (e.g., a subset of or among the one or more processors of the machine) configured to perform the operations described herein for that module. As another example, any module of the typography personalization 124 may include software, hardware, or both, that configure an arrangement of one or more processors 608 (e.g., among the one or more processors of the machine) to perform the operations described herein for that module. Accordingly, different modules of the attachment system 124 may include and configure different arrangements of such processors 608 or a single arrangement of such processors 608 at different points in time. Moreover, any two or more modules of the attachment system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
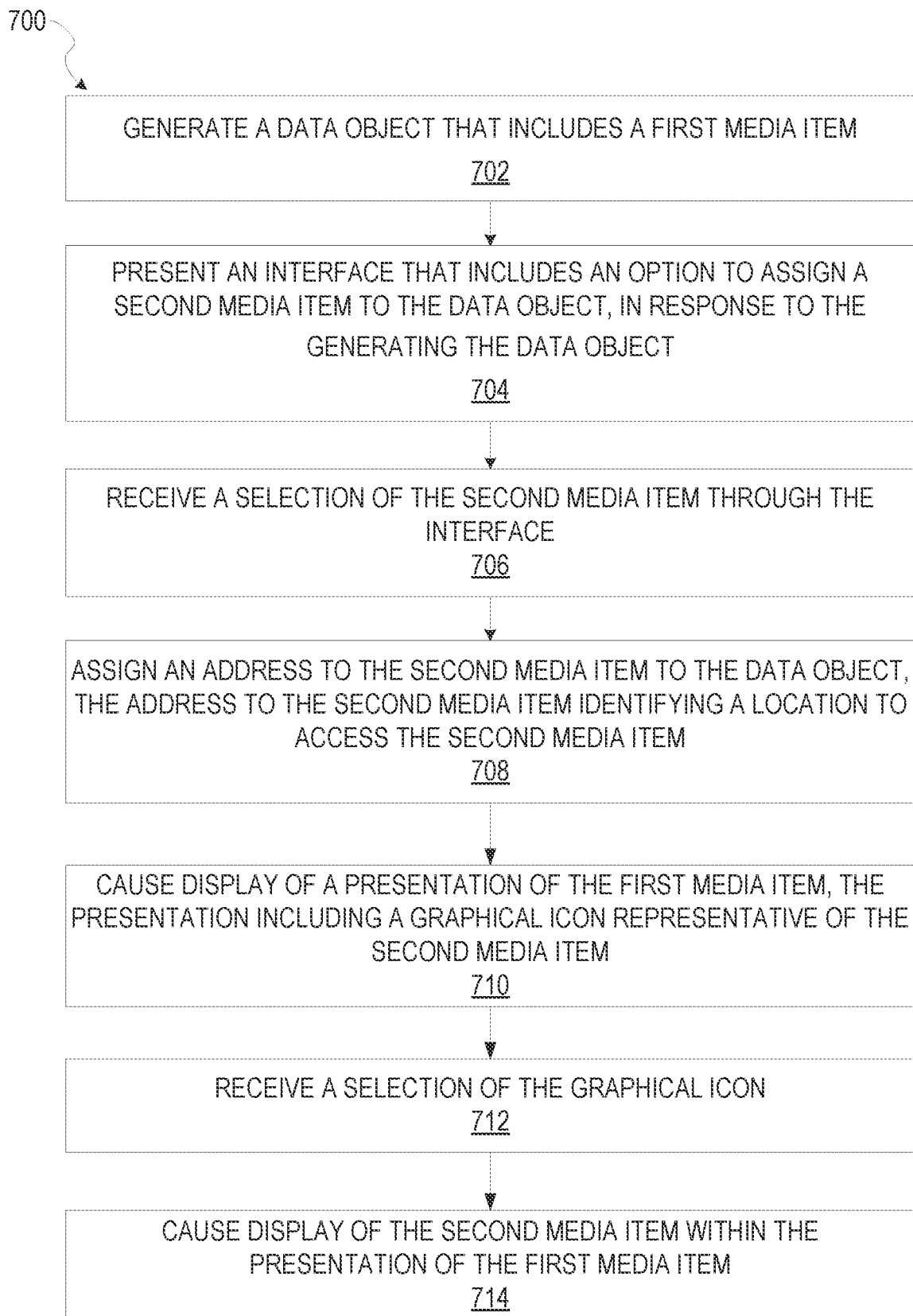
FIG. 7 is a flowchart illustrating various operations of the attachment system in attaching a second media item to a first media item, according to certain example embodiments.

FIG. 7 is a flowchart illustrating various operations of the attachment system 124 in performing a method 700 for embedding first media content with a link to second media content, according to certain example embodiments. Operations of the method 700 may be performed by the modules described above with respect to FIG. 6. As shown in FIG. 7, the method 700 includes one or more operations 702, 704, 706, 708, 710, 712, and 714.

Operation 702 may be performed by the media generation module 602. At operation 702, the media generation module 602 generates a data object (e.g., a message) that includes a first media item (e.g., image or video). For example, a user of a first client device 102 may capture or record an image or video, and append the image or video to a message to be transmitted to a second client device (or multiple client devices).

Operations 704 and 706 may be performed by the presentation module 604. At operation 704, the presentation module 604 generates and causes display of an interface that includes options to assign a second media item to the first media item, in response to the media generation module 602 generating the data object. In some instances, multiple media items (e.g., multiple URLs represented by one or more graphical icons) are assigned to the first media item. In some example embodiments, the interface may include a search window to receive search requests. A user of a client device 102 may provide user inputs that include search queries (e.g., a keyword or search term) into the interface. In response to receiving a search query, the presentation module 604 retrieves and displays one or more search results within the interface. For example, the user may provide a search query, and in response the presentation module 604 may retrieve one or more search results that include web pages. In further example embodiments, the presentation module 604 ranks the search results according to a relevance metric. In various example embodiments, the relevance metric indicates how relevant the search results are to the search queries or how relevant the search results are to the first media item (e.g., based on an image, an emoji, or text included in the first media item).

At operation 706, the presentation module 604 receives a user input selecting a second media item from among the set of search results, through the client device (e.g., a client device 102). For example, the second media item may include a web page. In response to receiving the selection of the second media item, the attachment module 608 assigns an address to the second media item (e.g., a URL) to the data object generated by the media generation module 602.

Assigning the address of the second media item to the first media item includes attaching a graphical icon representative of the second media item to the first media item. The graphical icon may be linked with the address to the second media item (e.g., a URL to a web page), such that interacting with the graphical icon causes a browser to cause display of the second media item (e.g., the web page). In some example embodiments, the graphical icon may be generated based on properties of the second media item. The properties may include a media type (e.g., picture, video, social media post, web page, audio, etc.).

Operation 710 may be performed by the presentation module 604. At operation 710, the presentation module 604 causes display of a presentation of the second media item. For example, a message (that includes the first media item) may be delivered by a first client device to one or more recipient devices (including a second client device). In response to the second client device receiving the message, the presentation module 604 causes display of the second media item at the second client device. The presentation of the second media item may include the graphical icon representative of the second media item.

At operation 712, the presentation module 604 receives a selection of the graphical icon through the second client device. For example, the graphical icon may be configured to receive user inputs through a touch-enabled device. The inputs may include upward or downward swiping gestures. In response to receiving the selection of the graphical icon, at operation 714 the presentation module 604 causes display of the second media item within the presentation of the first media item.

In some example embodiments, in response to receiving the selection of the graphical icon, the presentation module 604 retrieves the second media item based on the address. For example, the presentation module 604 may access a web page based on the URL to retrieve and cause display of the second media item within the presentation of the first media item. In some example embodiments, the second media item may be presented within the presentation of the first media item for a period of time determined based on the ephemeral timer system 202. For example, the second media item may only be made available for viewing by the presentation module 604 for a period of time (e.g., February 4, between the hours of 6:00 pm and 8:00 pm Pacific time), for a duration of time (e.g., 30 seconds), or while the second client device (e.g., a client device 102) is within a geographic region.

Figure 8:
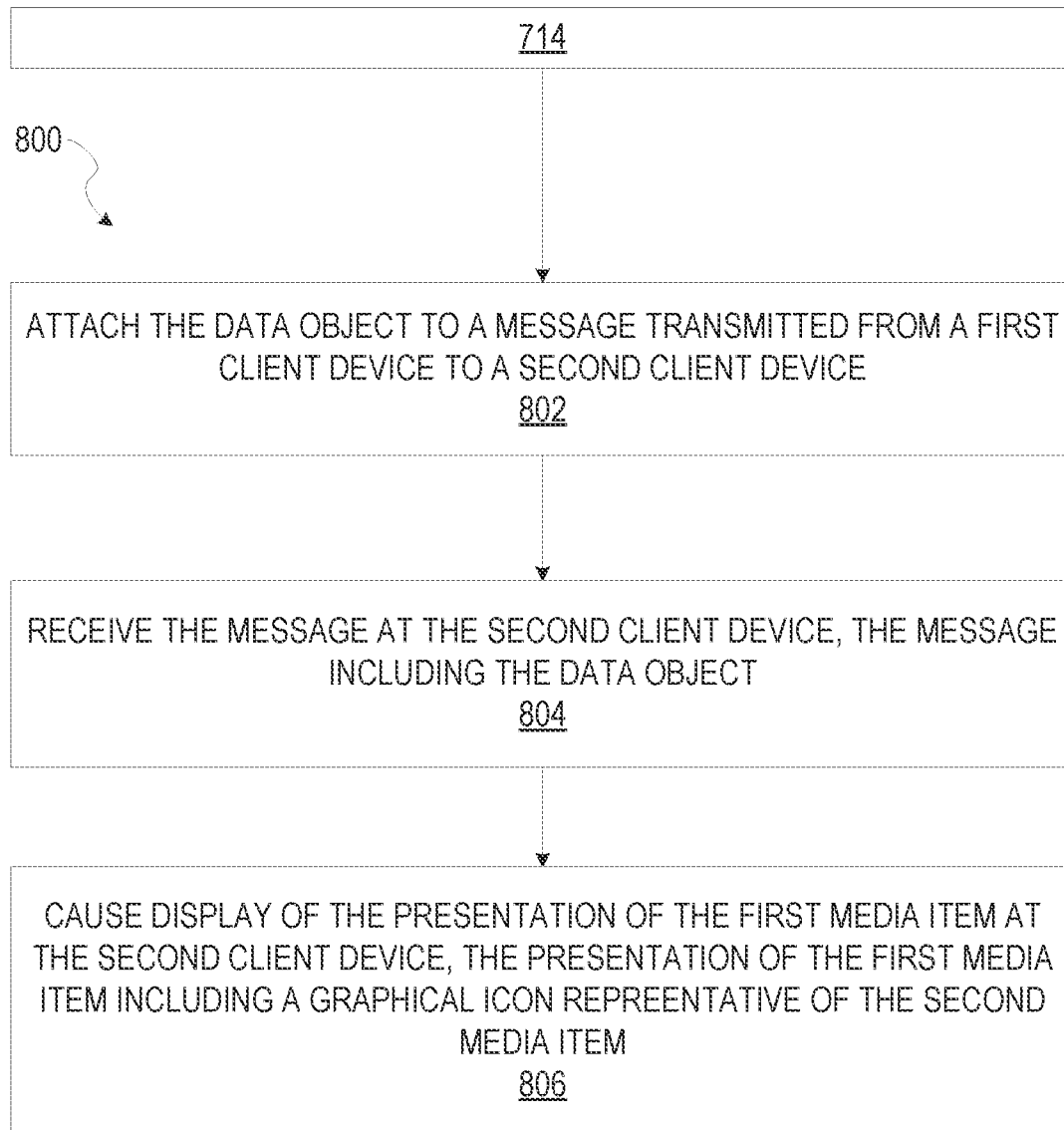
FIG. 8 is a diagram illustrating various operations of the attachment system in performing a method of causing display of the second media item within a presentation of the first media item, according to certain example embodiments.

FIG. 8 is a flowchart illustrating various operations of the attachment system 124 in performing a method 800 to attach a data object that includes a first media item embedded with a second media item to a message from a first client device to a second client device, according to certain example embodiments. Operations of the method 800 may be performed by the modules described above with respect to FIG. 6. As shown in FIG. 8, the method 800 includes one or more operations 802, 804, and 806, that may be performed as a part (e.g., precursor, subroutine) of the method 700.

At operation 802, the media generation module 602 receives a request to attach the data object to a message, by a first client device. A user of the first client device may generate a message to a second client device, and attach the data object to the message. For example, the data object may include a first media item such as an image captured by the user, and the message may include an ephemeral message.

At operation 804, the second client device receives the message from the first client device. In some example embodiments, the presentation module 604 generates and causes display of a notification at the second client device in response to detecting that the second client device has received the message.

At operation 806, the presentation module 604 causes display of a presentation of the first media item at the second client device. The presentation of the first media item may include a display of the first media item within a graphical user interface displayed at the second client device, and may include a graphical icon representative of the second media item at a position within the presentation. The graphical icon may be interactive, such that a user may touch or swipe the graphical icon to cause display of the second media item within the presentation.

Figure 9:
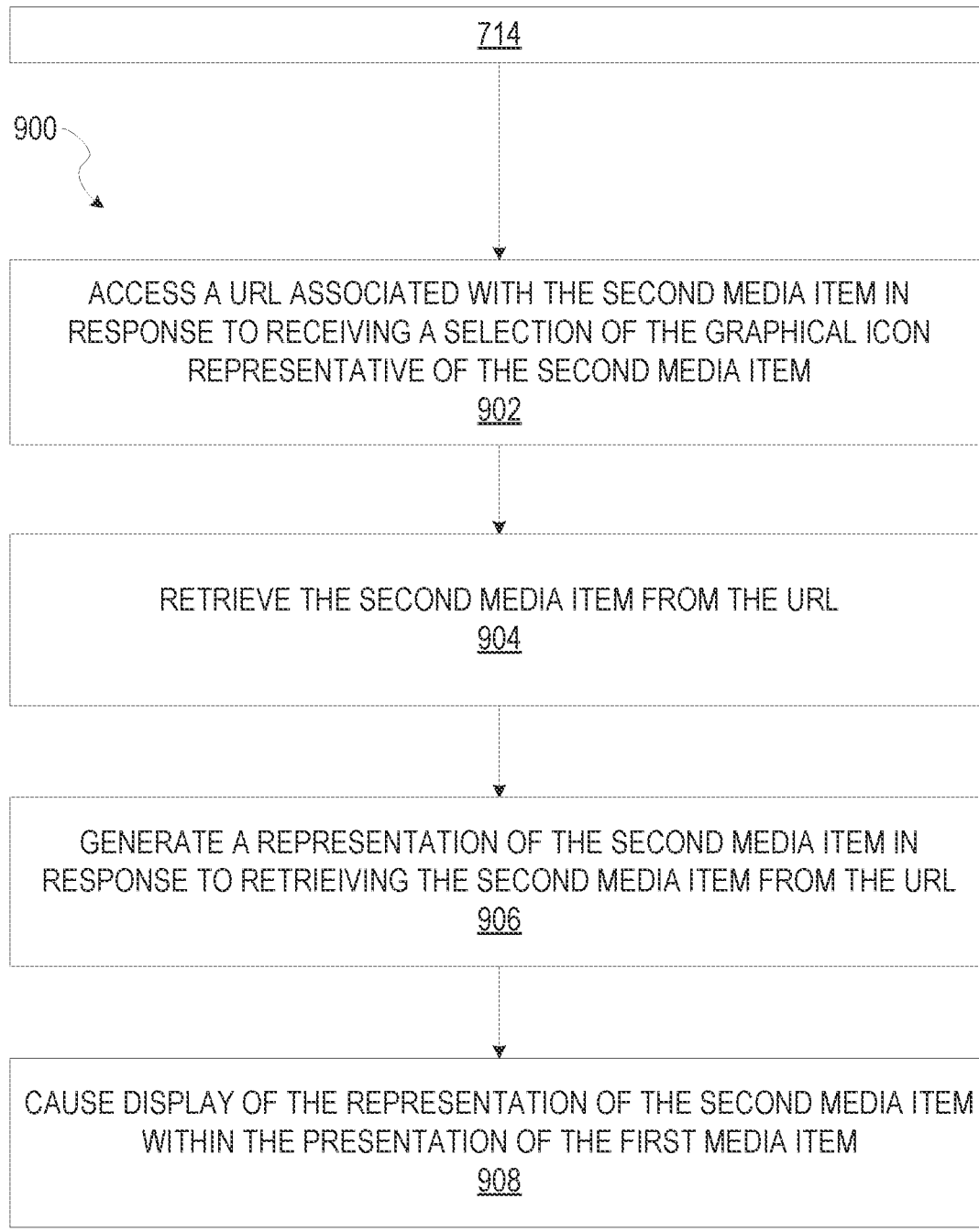
FIG. 9 is a diagram illustrating various operations of the attachment system in performing a method of causing display of the second media item within a presentation of the first media item, according to certain example embodiments.

FIG. 9 is a flowchart illustrating various operations of the attachment system 124 in performing a method 900 for causing display of a second media item within a presentation of a first media item, according to certain example embodiments. Operations of the method 900 may be performed by the modules described above with respect to FIG. 6. As shown in FIG. 9, the method 900 includes one or more operations 902, 904, 906, and 908, that may be performed as a part (e.g., precursor, subroutine) of the method 700.

At operation 902, the presentation module 604 accesses a URL associated with the second media item in response to receiving a selection of a graphical icon representative of the second media item within a presentation of a first media item. For example, a user of the second client device may provide a user input through the graphical icon, including a touch, a swipe, or a tapping gesture. In response to receiving the user input, the presentation module 604 accesses a URL associated with the second media item to retrieve the second media item.

At operation 904, the presentation module 604 retrieves the second media item from the URL. For example, the second media item may include a web page, or social media post, hosted at a URL and available through a network.

At operation 906, the presentation module 604 generates a representation of the second media item in response to retrieving the second media item from the URL. In some example embodiments, at operation 908 the presentation module 604 causes display of a browser window within the presentation of the first media item, and navigates the browser window to the URL to display the second media item. In further embodiments, the presentation module 604 accesses the URL to retrieve the second media item and generate a screenshot of the second media item, and displays the screenshot of the second media item within the presentation of the first media item.

Figure 10:
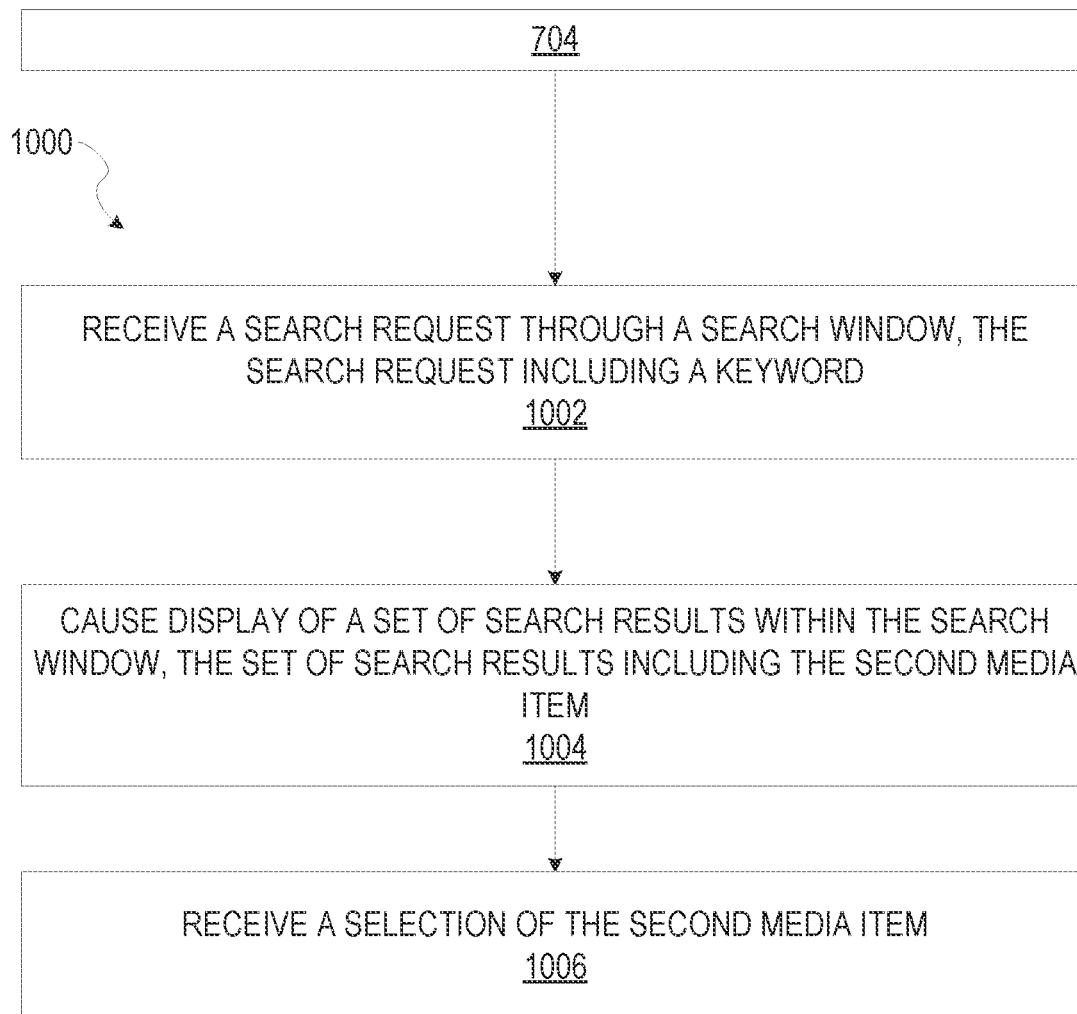
FIG. 10 is a diagram illustrating various operations of the attachment system in performing a method of receiving a selection of a media item to attach to a first media item, according to certain example embodiments.

FIG. 10 is a flowchart illustrating various operations of the attachment system 124 in performing method 1000 for causing display of a set of search results and receiving a selection of a second media item, according to certain example embodiments. Operations of the method 1000 may be performed by the modules described above with respect to FIG. 6. As shown in FIG. 10, the method 1000 includes one or more operations 1002, 1004, and 1006, that may be performed as a part (e.g., precursor, subroutine) of the method 700.

At operation 1002, the presentation module 604 receives a search request through the search window displayed at the client device 102. The search request may include user inputs such as text or audio queries (e.g., a keyword or search term) into the interface. For example, a user of the client device 102 may speak into a microphone of the client device 102 to provide a search query, or may simply enter the search query as a text string into the search window.

In response to receiving the search query, at operation 1004, the presentation module 604 retrieves and displays one or more search results within the interface. For example, the user may provide a search query, and in response the presentation module 604 may retrieve one or more search results that include web pages.

At operation 1006, the presentation module 604 receives a selection of a second media item from among the one or more search results. In response to receiving the selection of the second media item, the presentation module 604 retrieves an address of the second media item (e.g., a URL), and assigns the address to the data object.

Figure 11:
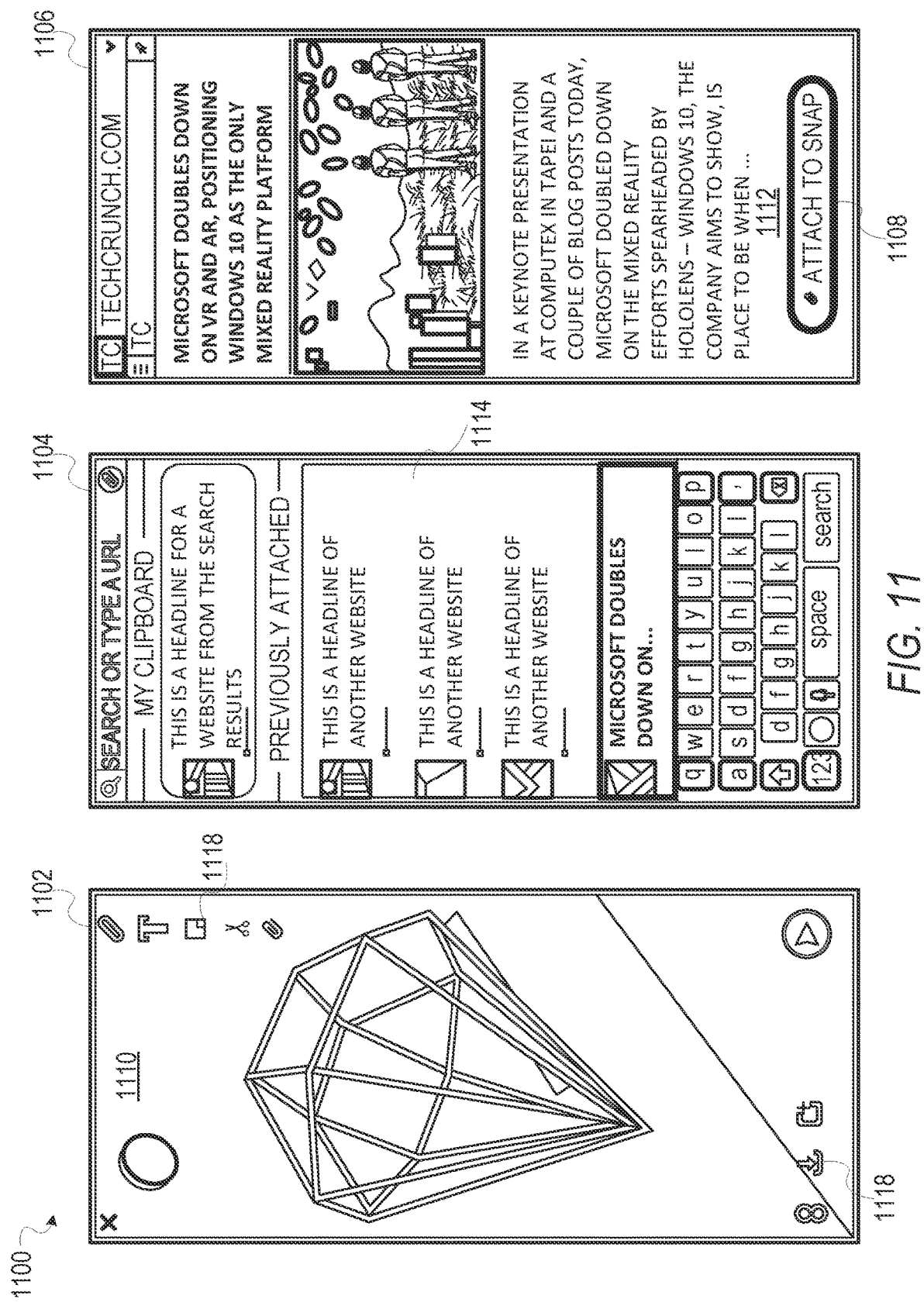
FIG. 11 is a diagram illustrating various interfaces to attach a second media item to a first media item, according to certain example embodiments.

FIG. 11 is a diagram illustrating various interfaces 1100 to attach a second media item to a first media item, according to certain example embodiments. The various interfaces 1100 include a first media item 1110 (as seen in interface 1102), a search interface 1104, and a second media item 1112 (as seen in interface 1106).

The first media item 1110 depicted in interface 1102 may include image or video data captured by a camera associated with the client device 102, as well as image data retrieved through a network, or received by the client device 102 in a message. For example, a user of the client device 102 may capture an image by the operations described in operation 702 in FIG. 7. Having captured the media item 1110, the presentation module 604 may generate and cause display of the interface 1102 at the client device 102, wherein the interface 1102 includes one or more interface elements 1118 to manipulate or otherwise alter the first media item 1110. In some example embodiments, as discussed above, the one or more interface elements may include an option to assign a second media item (e.g., the second media item 1112) to the first media item 1110. For example, upon capturing (or receiving) the first media item 1110, the presentation module 602 may generate and cause display of the one or more interface elements 1118.

As discussed in operation 1002 of FIG. 10, the presentation module 604 generates and causes display of the search interface 1104 in response to a user selecting an option to attach a second media item to the first media item, from among the one or more interface elements 1118. The search interface 1104 include a search bar where a user may enter a search query (e.g., a text string). For example, a user may provide search queries in the search interface 1104, and in response, the presentation module 602 may retrieve and present a set of search results 1114. In some example embodiments, the presentation module 602 may additionally retrieve one or more media items previously attached to media items in messages by the user.

Interface 1106 includes a presentation of a second media item 1112. For example, the user may select the second media item 1112 from among the set of search results 1114. The presentation module 602 generates and causes display of a presentation of the second media item 1112 (e.g., content of a website) at the client device 102. The presentation of the media item 1112 may include an attachment icon 1108. By selecting the attachment icon 1108, the attachment module 606 assigns the address to the second media item 1112 to the first media item 1110, as discussed in operation 708 of FIG. 7.

Software Architecture

Figure 12:
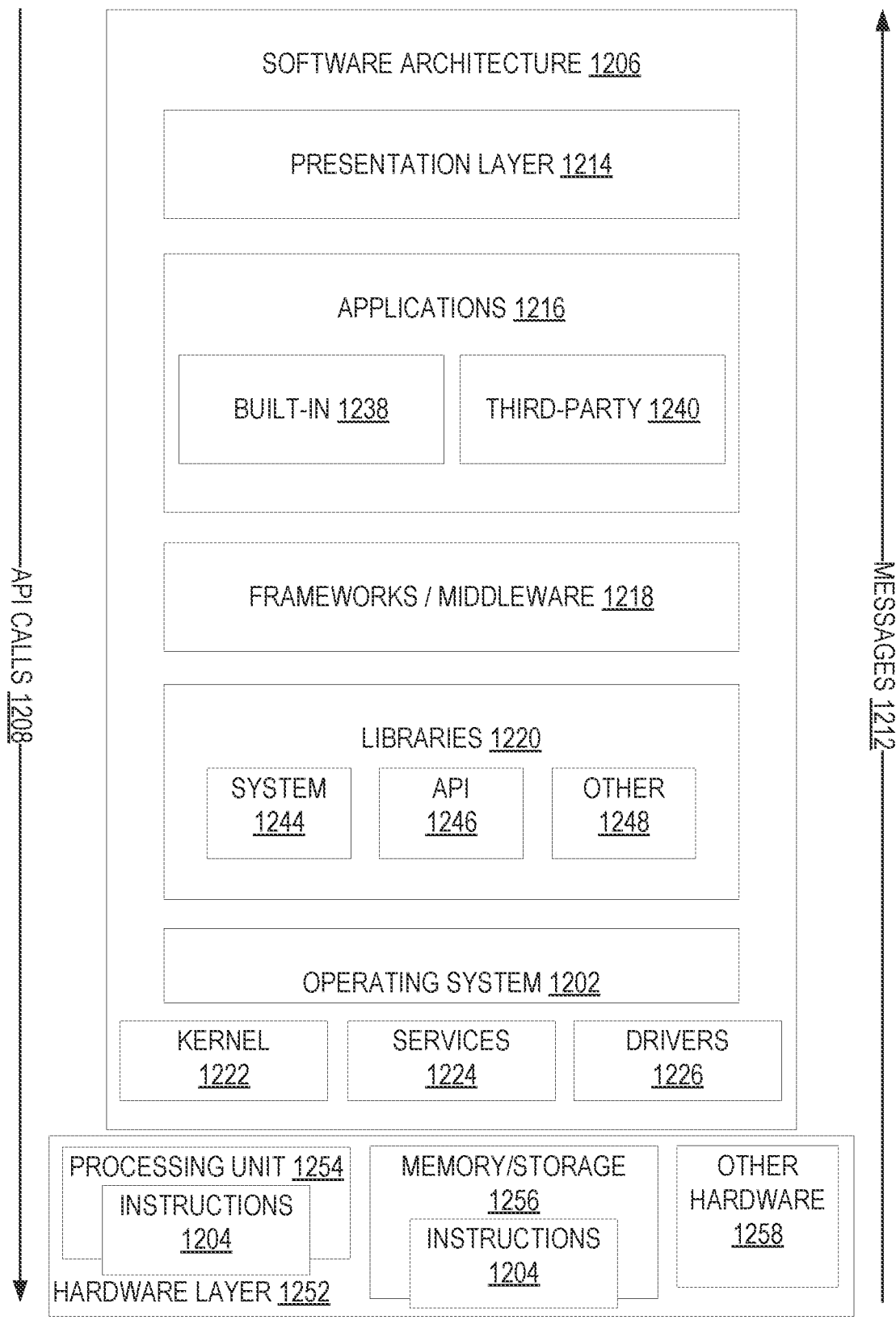
FIG. 12 is a block diagram illustrating a representative software architecture, which may be used in conjunction with various hardware architectures herein described and used to implement various embodiments.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as machine 1200 of FIG. 12 that includes, among other things, processors 1204, memory 1214, and I/O components 1218. A representative hardware layer 1252 is illustrated and can represent, for example, the machine 1200 of FIG. 12. The representative hardware layer 1252 includes a processing unit 1254 having associated executable instructions 1204. Executable instructions 1204 represent the executable instructions of the software architecture 1206, including implementation of the methods, components and so forth described herein. The hardware layer 1252 also includes memory and/or storage modules memory/storage 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, applications 1216 and a presentation layer 1214. Operationally, the applications 1216 and/or other components within the layers may invoke application programming interface (API) API calls 1208 through the software stack and receive a response as in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224 and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built in operating system functions (e.g., kernel 1222, services 1224 and/or drivers 1226), libraries 1220, and frameworks/middleware 1218 to create user interfaces to interact with users of the system. Alternatively, or additionally, in some systems interactions with a user may occur through a presentation layer, such as presentation layer 1214. In these systems, the application/component "logic" can be separated from the aspects of the application/component that interact with a user.

Figure 13:
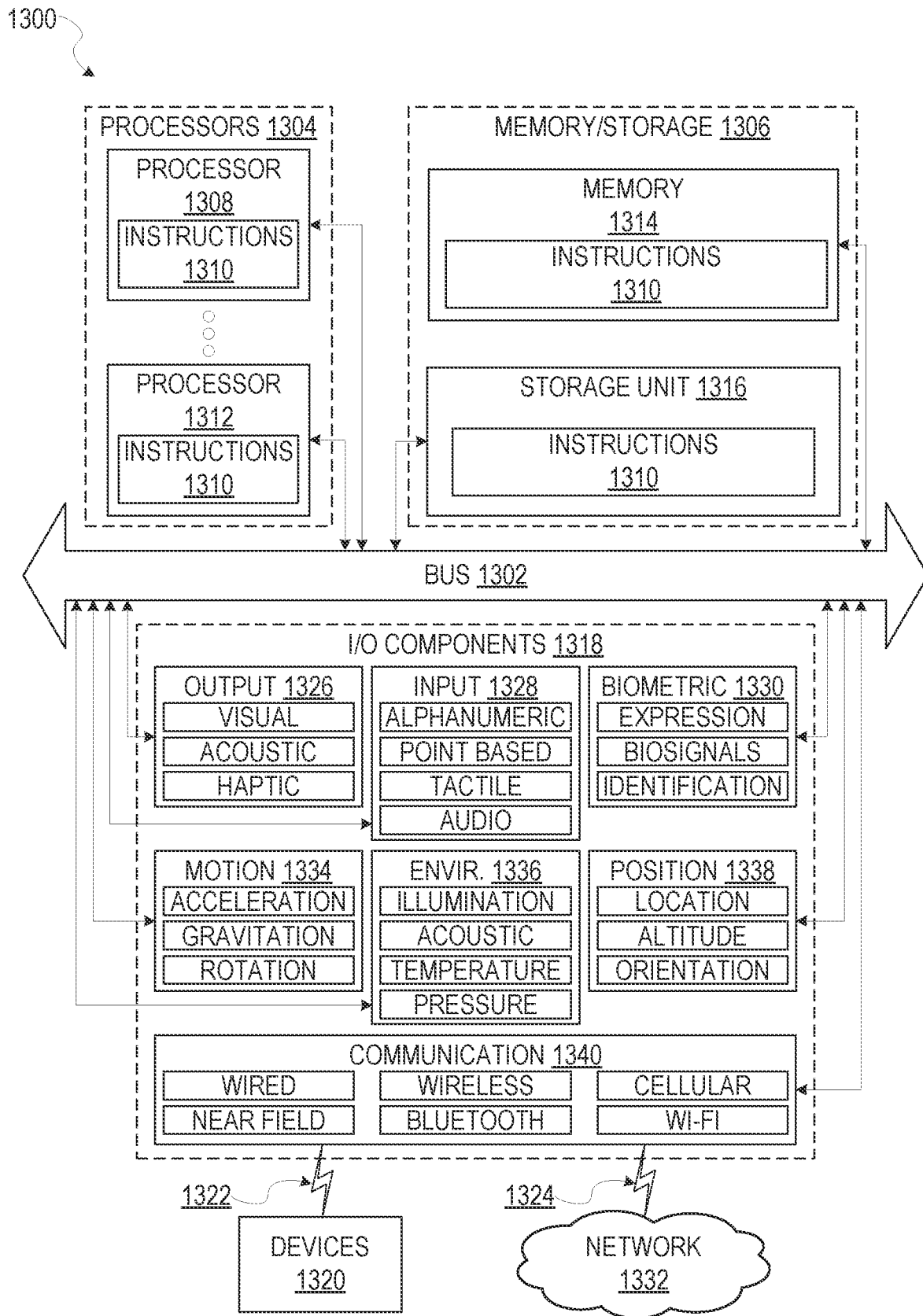
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental environment components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The U/O components 1318 may include communication components 1340 operable to couple the machine 1300 to a network 1332 or devices 1320 via coupling 1322 and coupling 1324 respectively. For example, the communication components 1340 may include a network interface component or other suitable device to interface with the network 1332. In further examples, communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a Universal Serial Bus (USB)).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as, location via Internet Protocol (IP) geo-location, location via Wi-Fi® signal triangulation, location via detecting a NFC beacon signal that may indicate a particular location, and so forth.

GLOSSARY

"ANAMORPHOSIS" in this context refers to distortions and transformations applied to a media items such as images and videos, such that the media items appear normal when viewed from a particular point or through a suitable viewing device, mirror, or lens.

"PERSPECTIVE" in this context refers to a viewing angle of a user at a particular location.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is provisionally claimed is:

1. A method comprising:
    causing display of a media item at a client device, the media item comprising image data;
    receiving a search request from the client device, the search request comprising a keyword;
    accessing a set of search results based on the keyword;
    determining a ranking of the set of search results based on the image data of the media item;
    causing display of a presentation of the set of search results at the client device based on the ranking;
    receiving a selection of a search result from among the presentation of the set of search results, the search result comprising graphical properties;
    generating a representation of the search result based on the graphical properties; and
    applying the representation of the search result upon the media item.

2. The method of claim 1, wherein the method further comprises:
    generating a data object that comprises the media item and an address of the search result.

3. The method of claim 2, wherein the method further comprises:
    generating a message that includes the data object.

4. The method of claim 2, wherein the generating the data object further comprises:
    assigning the address of the search result to the representation; and
    applying a display of the representation to the media item.

5. The method of claim 1, wherein the determining the ranking of the set of search results based on the image data further comprises:
    determining a relevance metric of a search result from among the set of search results based on the image data; and
    presenting the search result among the set of search results based on the relevance metric.

6. The method of claim 4, wherein the relevance metric is based on an attribute of the media item.

7. The method of claim 1, wherein the attribute comprises an image feature.

8. A system comprising:
    a memory; and
    at least one hardware processor couple to the memory and comprising instructions that cause the system to perform operations comprising:
    causing display of a media item at a client device, the media item comprising image data;
    receiving a search request from the client device, the search request comprising a keyword;
    accessing a set of search results based on the keyword;
    determining a ranking of the set of search results based on the image data of the media item;
    causing display of a presentation of the set of search results at the client device based on the ranking;
    receiving a selection of a search result from among the presentation of the set of search results, the search result comprising graphical properties;
    generating a representation of the search result based on the graphical properties; and
    applying the representation of the search result upon the media item.

9. The system of claim 8, wherein the instructions further comprise:
    generating a data object that comprises the media item and an address of the search result.

10. The system of claim 9, wherein the instructions further comprise:
    generating a message that includes the data object.

11. The system of claim 9, wherein the generating the data object further comprises:
    assigning the address of the search result to the representation; and
    applying a display of the representation to the media item.

12. The system of claim 8, wherein the determining the ranking of the set of search results based on the image data further comprises:
    determining a relevance metric of a search result from among the set of search results based on the image data; and
    presenting the search result among the set of search results based on the relevance metric.

13. The system of claim 12, wherein the relevance metric is based on an attribute of the media item.

14. The system of claim 8, wherein the attribute comprises an image feature.

15. A non-transitory machine-readable storage medium comprising instructions that, when executed by one or more processors of a machine, cause the machine to perform operations including:
    causing display of a media item at a client device, the media item comprising image data;
    receiving a search request from the client device, the search request comprising a keyword;
    accessing a set of search results based on the keyword;
    determining a ranking of the set of search results based on the image data of the media item;
    causing display of a presentation of the set of search results at the client device based on the ranking;
    receiving a selection of a search result from among the presentation of the set of search results, the search result comprising graphical properties;
    generating a representation of the search result based on the graphical properties; and
    applying the representation of the search result upon the media item.

16. The non-transitory machine-readable storage medium of claim 15, wherein the instructions further comprise:
generating a data object that comprises the media item and an address of the search result.

17. The non-transitory machine-readable storage medium of claim 16, wherein the instructions further comprise:
generating a message that includes the data object.

18. The non-transitory machine-readable storage medium of claim 15, wherein the generating the data object further comprises:
assigning the address of the search result to the representation; and
applying a display of the representation to the media item.

19. The non-transitory machine-readable storage medium of claim 15, determining the ranking of the set of search results based on the image data further comprises:
determining a relevance metric of a search result from among the set of search results based on the image data; and
presenting the search result among the set of search results based on the relevance metric.

20. The non-transitory machine-readable storage medium of claim 15, wherein the attribute comprises an image feature.

* * * * *